TORSIONAL MODE CERAMIC BAND-PASS FILTER

Filed June 17, 1963

JOSEPH W. CROWNOVER
INVENTOR.

BY White and Haefliger

ATTORNEY.

United States Patent Office
3,302,137
Patented Jan. 31, 1967

3,302,137

TORSIONAL MODE CERAMIC BAND-PASS FILTER

Joseph W. Crownover, La Jolla, Calif., assignor of twenty-five percent to William W. Haefliger, Los Angeles, Calif.

Filed June 17, 1963, Ser. No. 288,279
11 Claims. (Cl. 333—72)

This invention relates generally to electrical mechanical filters, and more particularly to ceramic electrical mechanical filters utilizing a torsional mode of oscillation.

The piezoelectric effect in polycrystalline ceramic materials is characterized by a modification of the physical dimensions of their crystalline arrangement when subjected to electric fields. These dimensional changes become very pronounced at the natural reasonant frequency of the material which is primarily a function of its dimensions. Since the effective "Q" of these mechanically reasonant circuits compares favorably with those attainable by L.–C. components, it becomes possible to very efficiently transmit electrical energy through a piezoelectric device over a band of frequencies.

During the recent past, a number of ceramic electrical mechanical filters have been developed, but due to the mechanical resonance and piezoelectric characteristics of such devices, only a narrow band of frequencies is able to pass through the filter. Thus, concentric electrodes on a given surface of a disc must necessarily be different in diameter, and consequently such different electrodes are subject to different phases of stress, their outputs therefore being out of phase with one another. This characteristic affords a serious limitation in filter work using such devices.

The present invention has as a major object the provision of an electrical mechanical filter characterized in that a large number of geometrically identical input and output electrodes may be provided, each to be subjected to the same stress phase. This effect is of great importance in that such novel filters may then be used in computor band-pass logic circuitry.

Considering the broader aspects of the invention, the novel band-pass filter may comprise a generally axially extending and piezoelectrically responsive body, and input and output electroding carried by the body to spiral about its axis and generally along the body length with relative arrangement such that the body will produce an output signal at an output electrode and at a torsional resonant frequency of the body in response to predetermined input signal excitation of input electroding. As will appear, the body may typically be cylindrical and have at least three electrodes extending therealong in spaced relationship, certain of such electrodes being adapted to operate as input and output electrodes, alternate electrodes typically being electrically interconnected. Thus, an output electrode may be located between two of the alternate electrically interconnected electrodes for shielding from an input electrode, or an input electrode may be located between two alternate interconnected electrodes for shielding from an output electrode.

The invention further contemplates the provision of means to mount the body for torsional vibration, the mounting typically being at a nodal location on the body, an will be brought out. In addition, the invention contemplates the inclusion of means electrically connected with the input electroding for transmitting the input signal thereto.

These and other objects and advantages of the invention, as well as the details of illustrative embodiments, will be further understood from the following detailed description of the drawing in which.

Figure 1:
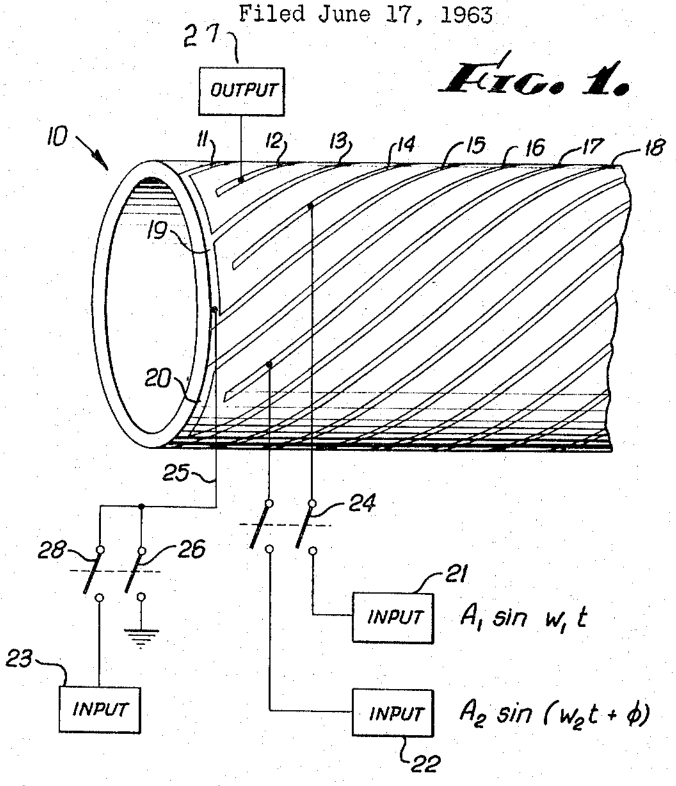
FIG. 1 is a perspective showing of a cylindrical body with multiple spiral electrodes thereon connected with input signal transmitting means.

Referring first to FIG. 1, the generally axially extending and piezoelectrically responsive body is shown in the form of a cylinder 10, typically tubular and relatively thin walled. The body is preferably formed of piezoelectric or electrostrictive ceramic material such as barium titanate. The filter also includes a series of electrodes designated at 11 through 18 in the form of narrow helical bands of silver or other suitable electroding material applied to the surface of the cylinder, the bands running parallel to one another and winding or spiraling about the cylinder axis, yet remaining narrowly separated. Alternate bands 11, 13 and 15 typically join a ring-shaped silver band 19 at one end of the cylinder, and alternate bands 16 and 18 likewise join a ring-shaped band 20 at said end of the cylinder.

As brought out in my U.S. Patent 3,035,126, when a voltage differential is applied across a pair of successive electrodes, they become relatively charged to effect a degree of electrically induced molecular alignment of the ceramic material between the electrodes. As a result of the electrostrictive properties of the material, such molecular orientation produces mechanical expansion of the ceramic strip between the electrodes, resulting in a mechanical twisting of the cylinder. Referring to the present application, it will be noted that means is provided at 21 and 22 as well as at 23 for providing an input signal to different of the electrodes. If the input means 21 provides a signal transmission through the switch 24 to the electrode 14, and if the alternate electrodes 11, 13 and 15 are grounded as through band 19, lead 25 and closed switch 26, the signal will be seen to be applied across the electrode 14 and the adjacent grounded electrodes 13 and 15, producing a twist in the cylinder. Such twist will result in the production of an output signal at the electrode 12 which may be sensed and used at 27. In this regard, it will be noted that the electrodes 12 and 14 are effectively shielded from one another by the intermediate grounded electrode 13. Alternately, the input source 23 may be connected through the closed switch 28 and the lead 25 to the alternate electrodes 11, 13 and 15, and the electrode 14 may be suitably grounded. The electrodes 16 through 18 may also be considered as input or output electrodes, and signals may be developed across adjacent electrodes when a potential difference is created therebetween at least in part as a result of cylinder twist produced by signals applied across other electrodes. Accordingly, a great number of identical input and output electrodes may be provided, and each will be subjected to the same stress phase.

Figure 2:
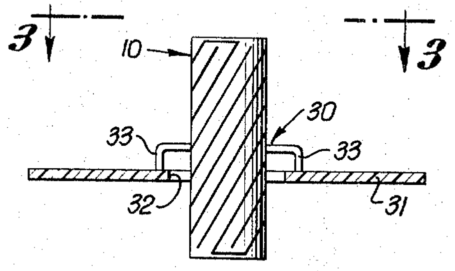
FIG. 2 is an elevation showing the manner in which the FIG. 1 body may be mounted at a nodal point.
Figure 3:
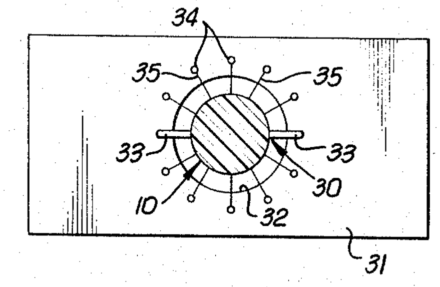
FIG. 3 is a plan view taken on line 3—3 of FIG. 2.

Referring to FIG. 2 and 3, the cylinder 10 with electrodes thereon, shown as diagonal lines, is mounted for torsional vibration, the mounting means connecting to the cylinder at a nodal location generally indicated at 30. Such mounting means typically takes the form of an insulative plate 31 containing an opening 32 through which the cylinder extends with clearance as shown. The mounting means also includes supporting wires or brackets 33 extending from the plate to the cylinder 10 at the mounting location 30. FIG. 3 illustrates the manner in which the electrodes on the cylinder surface may be electrically connected to terminals 34 on the plate 31, wires 35 serving this purpose and extending from the terminals 34 into electrical contact with the different electrodes.

If desired, these wires 35 may take the place of the supporting brackets 33 to serve a dual function of both supporting the cylinder and electrically connecting the electrodes thereon to the terminals 34.

Figure 4:
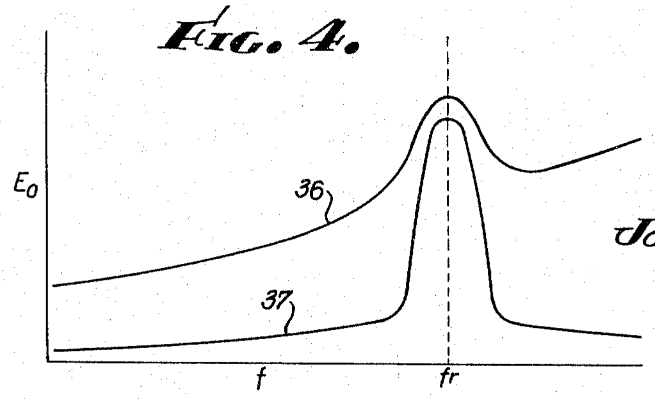
FIG. 4 is a graph illustrating the peaking of the output signal with and without output electrode shielding, and as a function of applied frequency.

FIG. 4 shows the manner in which the output voltage $E_0$ varies with applied frequency, curve 36 representing the condition when input and output electrodes on the body 10 are not electrically shielded, and curve 37 representing the shielded condition. As is clear from this graph, the output voltage or response is much more critical as respects applied input frequency when the input and output electrodes are shielded. In this regard, the output voltage is also generally proportional to torsional stress developed in the cylinder. Further, both curves 36 and 37 show the possibilities of frequency band-pass filter usage of the device.

One further advantage of the torsional system lies in the fact that its resonant frequency is effectively independent of diameter. The resonant frequency of torsional mode of oscillation in a bar is:

$$f_r\frac{1}{2l}\sqrt{\frac{G}{P}} \qquad (1)$$

where:

$G$=modulus of rigidity $G=E/2(1+\sigma)$ where:

$E$=Young's modulus in dynes/cm.$^2$ $\sigma$=Poisson's ratio $\rho$=density in gms./cm.$^3$ $l$=length in cm.

The center frequency of an I.F. filter as used in radio frequency receivers is 455K cycles. The length of a ceramic rod needed in the construction of such a filter is quite small. If a lead-titanate, lead zirconate ceramic rod is used where the pertinent mechanical properties are:

$E=7.5\times10^{11}$ dynes/cm.$^2$
$\rho=7.65$ gms./cm.$^3$
$\sigma=.3$
$l$=length in cm.

the required length "1" of a ceramic rod may be determined as follows:

$$l=\frac{1}{2f_{r_0}}\sqrt{\frac{E}{2\rho(1+\sigma)}}$$

$$=\frac{10^{-6}}{2(455)}\sqrt{\frac{7.5\times10^{11}}{2(7.65)(1+.3)}}$$

$$=.215\text{ cm.}$$

This represents an exceedingly small length and when used with a correspondingly equal diameter, the system lends itself to the construction of small I.F. transformers. This fact in turn lends itself very well to the present need of micro miniaturization of electronic circuitry.

Referring back to FIG. 1, if two 180° out-of-phase signals are applied, each to a separate helical electrode on the body 10, no output will be generated, whereas if the two signals are in-phase, the stress development in the cylinder will be doubled and the oututp signal twice as large. This addition and subtraction of stresses in conjunction with the addition and subtraction capabilities of output signals lends itself very well to signal mixing circuits and general high frequency transformer applications.

I claim:

1. A band pass filter, comprising a generally axially extending and piezoelectrically responsive body, and input, output and shielding electroding carried by the body to spiral about the body axis and generally along the body with relative arrangement such that the body will produce an output signal at an output electrode and at a torsional resonance frequency of the body in response to predetermined input signal excitation of input electroding the shielding electroding located to shield input and output electroding.

2. A filter as defined in claim 1, including means to mount the body for torsional vibration, 3. A filter as defined in claim 2, in which said means mounts the body at a nodal location thereof.

4. The filter as defined in claim 1, including means electrically connected with said input electroding for transmitting said input signal thereto.

5. A band pass filter, comprising a substantially cylindrical body of piezoelectrically responsive material, and multiple electrodes extending along the body in spaced relationship and spiraling about the body axis, certain of said electrodes being adapted to operate as input and output electrodes whereby the body will produce an output signal at an output electrode and at a torsional resonance frequency of the body in response to predetermined input signal excitation of input electroding, another of said electrodes being connectible with reference potential and being located to shield said input and output electrodes.

6. The filter as defined in claim 5, in which selected electrodes are electrically interconnected.

7. The filter as defined in claim 6, including means electrically connected with input electroding for transmitting an A.C. input signal thereto.

8. The filter as defined in claim 7, wherein an output electrode is located between two of said selected electrically interconnected electrodes.

9. A filter as defined in claim 1, including means to mount the body for torsional vibration.

10. A filter as defined in claim 9, in which said means mounts the body at a nodal location thereof.

11. The filter as defined in claim 5, including means electrically connected with input electrodes for transmitting to different of said input electrodes A.C. input signals of differing phase.

References Cited by the Examiner

UNITED STATES PATENTS

| | | | |
|---|---|---|---|
| 2,928,069 | 3/1960 | Petermann | 333—72 |
| 3,035,126 | 5/1962 | Crownover | 179—100.41 |

ELI LIEBERMAN, *Primary Examiner.*